Figure 13:
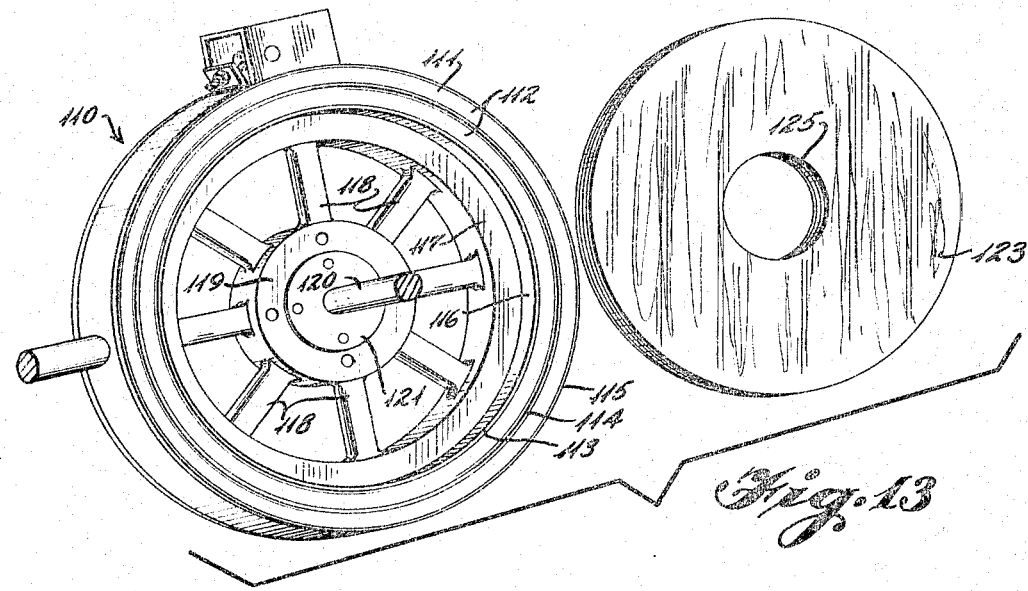

May 9, 1967   R. R. POLLOCK   3,318,752
DECORATIVE TIRE TRIM VULCANIZING APPARATUS
Filed Dec. 13, 1965   4 Sheets-Sheet 1
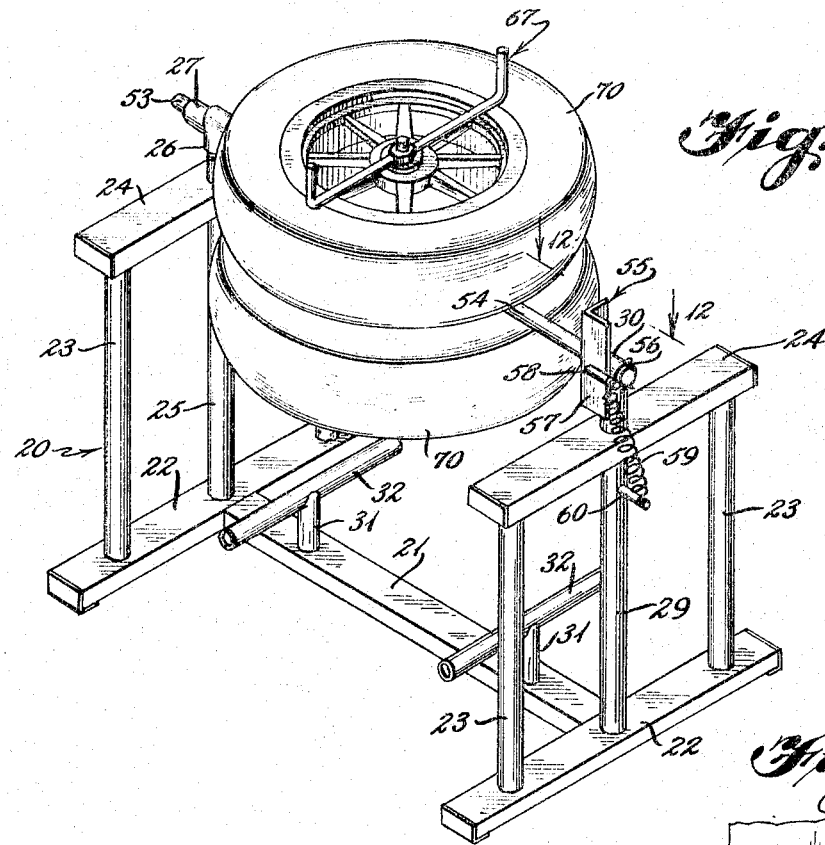
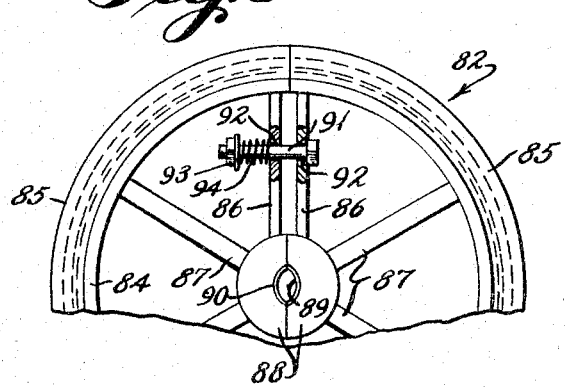
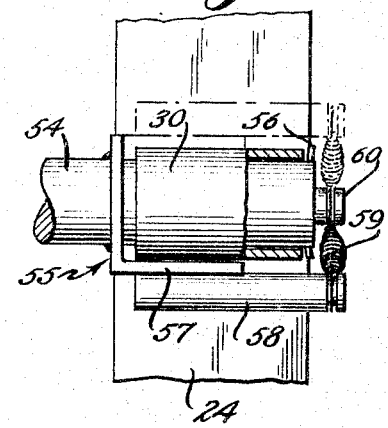
INVENTOR
RANDOLPH R. POLLOCK
BY
ATTORNEYS May 9, 1967   R. R. POLLOCK   3,318,752
DECORATIVE TIRE TRIM VULCANIZING APPARATUS
Filed Dec. 13, 1965   4 Sheets-Sheet 2
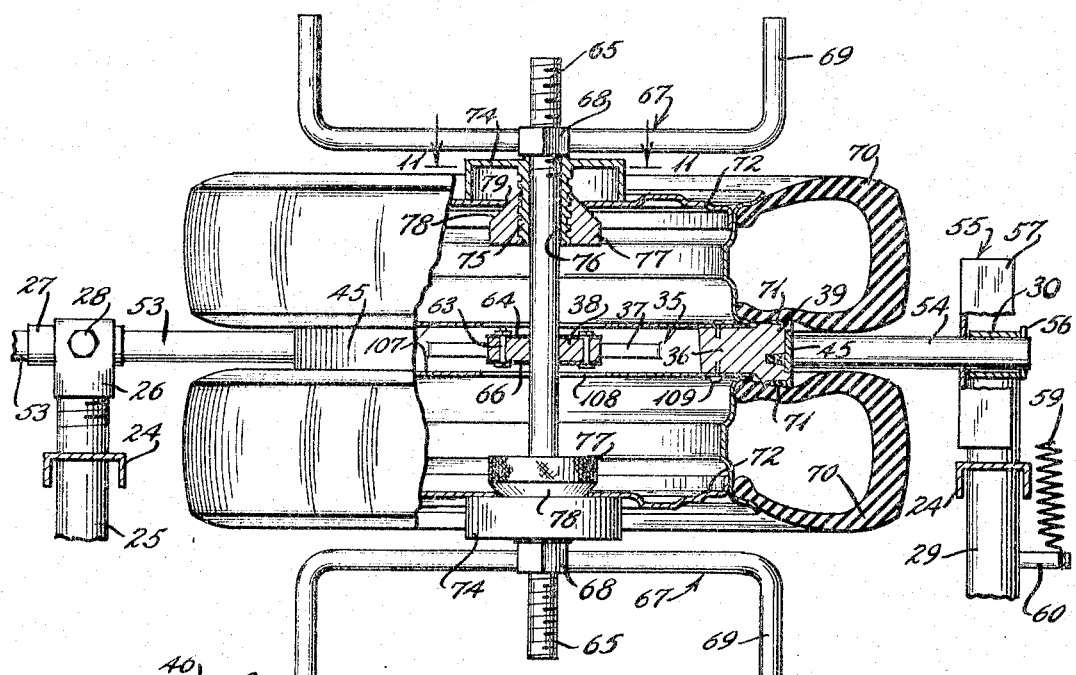
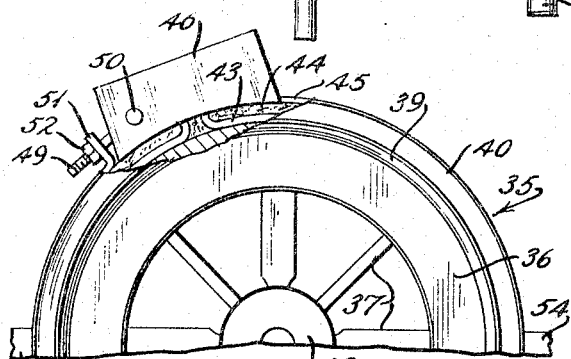
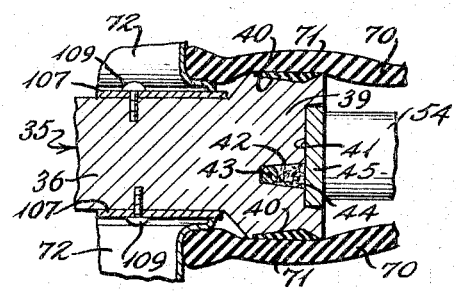
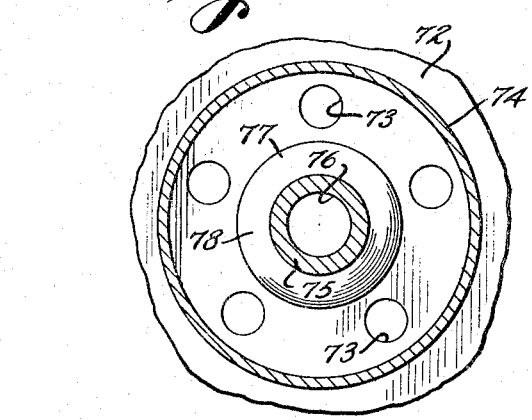
INVENTOR
RANDOLPH R. POLLOCK
BY
ATTORNEYS

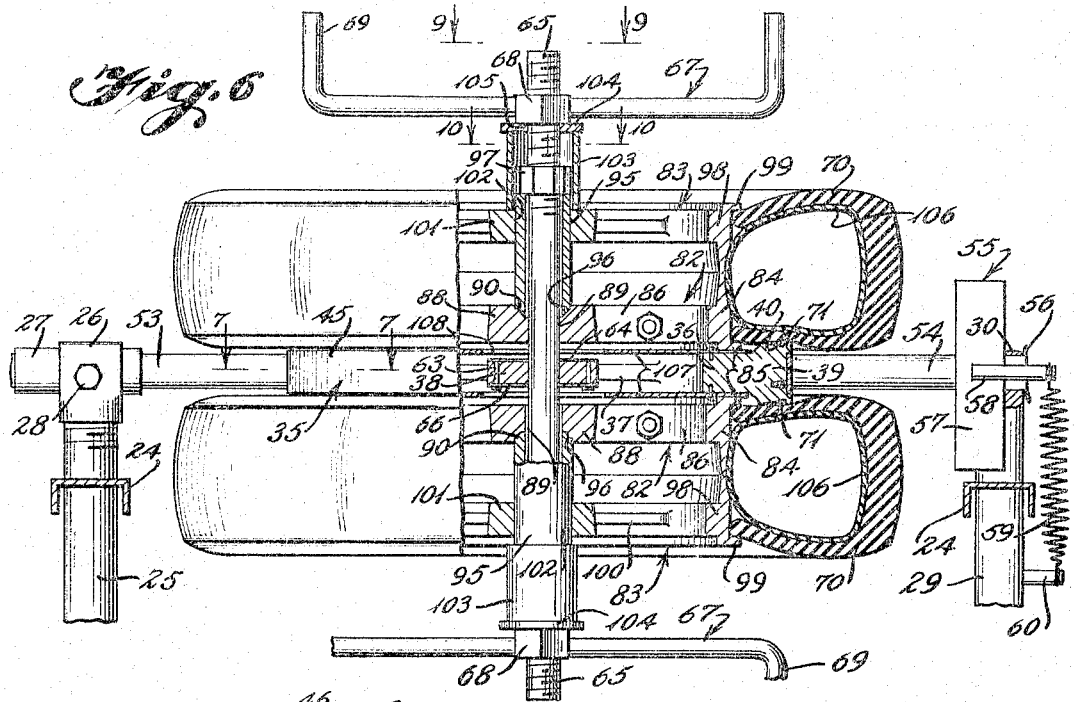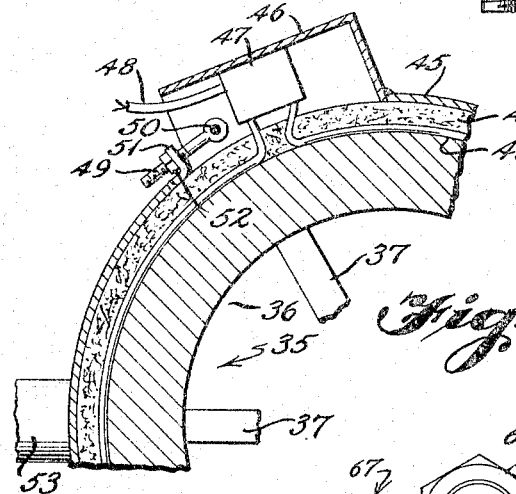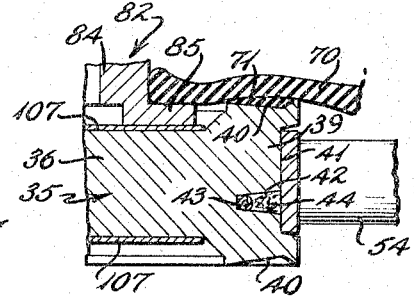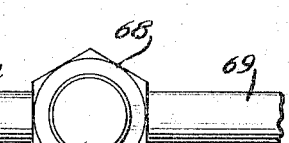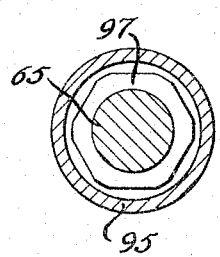

May 9, 1967  R. R. POLLOCK  3,318,752
DECORATIVE TIRE TRIM VULCANIZING APPARATUS
Filed Dec. 13, 1965  4 Sheets-Sheet 4

INVENTOR
RANDOLPH R. POLLOCK
BY
ATTORNEYS

United States Patent Office 3,318,752
Patented May 9, 1967

3,318,752
DECORATIVE TIRE TRIM VULCANIZING
APPARATUS
Randolph R. Pollock, 1103 N. Locust Ave.,
Lawrenceburg, Tenn. 38464
Filed Dec. 13, 1965, Ser. No. 513,467
6 Claims. (Cl. 156—394)

This is a continuation-in-part application which includes the subject matter of an earlier application entitled Decorative Trim Vulcanizing Apparatus, Ser. No. 430,014, filed Feb. 3, 1965, now abandoned.

The invention relates to a portable apparatus utilized in the vulcanizing of decorative trim to one or more automobile tires, as well as to means for mounting the tires on such apparatus regardless of whether the tires are mounted on a rim or not.

The present invention is an improvement over copending application Ser. No. 233,296, filed Oct. 26, 1962, now Patent No. 3,194,712.

Heretofore, many devices have been provided for applying decorative trim such as whitewalls or the like to automobile tires and some of these prior devices have applied the trim to the tire while the tire remained mounted on the rim, and other devices applied the trim while the tire was not mounted. These prior devices have been cumbersome and unwieldly, expensive to produce and operate, failed to center the tire and applied the trim in a non-concentric position, consumed an excessive amount of time, and in most cases it has been necessary that they remain in a permanent position.

It is an object of the invention to overcome the deficiancies enumerated and to provide a portable decorative trim vulcanizing apparatus by means of which decorative trim can be applied to multiple tire casings simultaneously regardless of whether the casings are mounted on a rim or not.

Another object of the invention is to provide a portable decorative trim vulcanizing apparatus having a heatable mold ring rotatably mounted on a support frame and capable of applying decorative trim to two tire casings simultaneously regardless of whether or not the casings are the same size.

A further object of the invention is to provide an easily centered auxiliary rim for temporarily supporting unmounted tire casings during the decorative trim vulcanizing process.

Figure 14:
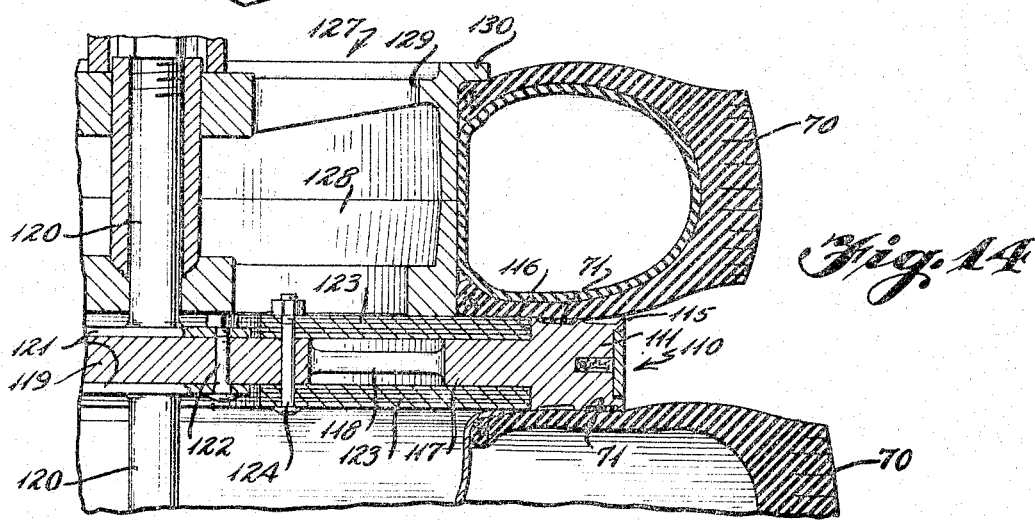
Figure 16:
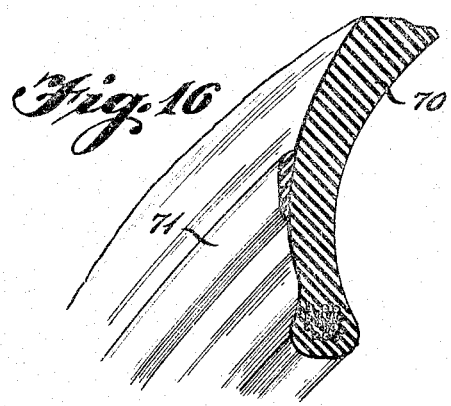
Figure 15:
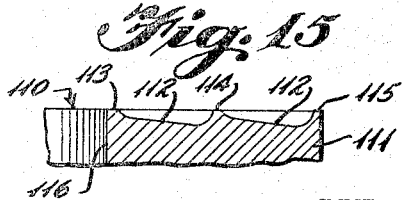

Other objects and advantages of the invention will be apparent from the following description taken in conjunction with the accompanying drawings in which:

FIG. 1 is a perspective illustrating one application of the invention;

FIG. 2, a fragmentary enlarged side elevation thereof with portions broken away and illustrating a pair of tires mounted on rims;

FIG. 3, a fragmentary top plan view of the heatable mold ring;

FIG. 4, an enlarged fragmentary vertical section of the mold ring illustrating the vulcanizing of decorative trim to a pair of tire casings mounted on rims;

FIG. 5, a fragmentary top plan view of an expandable auxiliary rim for unmounted tire casings;

FIG. 6, a fragmentary side elevation similar to FIG. 2 illustrating a pair of tires supported by auxiliary rims;

FIG. 7, a fragmentary enlarged section of the mold ring on the line 7—7 of FIG. 6;

FIG. 8, an enlarged fragmentary vertical section similar to FIG. 4 illustrating the tire casings supported by auxiliary rims;

FIG. 9, an enlarged fragmentary top plan view of the force applying means;

FIG. 10, an enlarged section on the line 10—10 of FIG. 6;

FIG. 11, an enlarged section on the line 11—11 of FIG. 2;

FIG. 12, an enlarged section on the line 12—12 of FIG. 1;

FIG. 13, an exploded perspective of a modified mold ring;

FIG. 14, an enlarged fragmentary vertical section illustrating the mold ring of FIG. 13 in use;

FIG. 15, an enlarged fragmentary vertical section of the mold ring illustrating the multiple trim receiving grooves; and FIG. 16, an enlarged fragmentary section of a tire casing illustrating the decorative trim after it has been vulcanized to the tire casing.

With reference to the drawings, a frame 20 is provided including a central base member 21 connected at opposite ends to lower cross members 22. Each of the lower cross members has an upright post 23 adjacent each end which supports an upper cross member 24 in spaced relation to the lower cross members 22. A central post 25 is mounted on one of the lower members 22 and extends upwardly through the upper member 24. A yoke 26 is threadedly mounted on the upper end of the post 25 and a sleeve 27 is pivotally mounted within such yoke by pins 28. A central post 29 is mounted on the other lower member 22 and extends upwardly through the other upper member 24. A bearing 30 is welded or otherwise attached to the upper end of the post 29 substantially in alignment with the sleeve 27. If desired, the central base member 21 may have a pair of spaced relatively short upstanding projections 31 each having a transverse bar 32 fixed thereto for a purpose which will be described later.

In order to perform the vulcanizing process, a mold ring 35 is provided having an outer ring 36 connected by spokes 37 to a hub 38. The outer ring 36 has an enlarged portion 39 with annular grooves 40 on each side of a cross-sectional configuration corresponding to the configuration of the decorative trim to be applied. The mold ring 35 is provided with a recess 41 in its outer periphery and a groove 42 extending inwardly therefrom in which an electrical resistance coil 43 is received. An asbestos type packing 44 is placed in the groove 42 exteriorly of the coil 43 to retain the heat given off by the coil within the enlarged portion 39.

The mold ring 35 is rotatably mounted on the frame 20 by an expandable band 45 located within the recess 41. As illustrated in FIGS. 3 and 7, one end of the band 45 is connected to a housing 46 having a thermostat 47 to which the ends of the coil 43 are connected. The thermostat 47 is provided with electrical energy by conduits 48 from a source of energy not shown. An eye bolt 49 is pivotally mounted on a pin 50 carried by the housing 46 and such bolt is adapted to pass through an opening (not shown) in an outwardly extending flange 51 at the opposite end of the band 45 where it is secured by a nut 52 to draw the band into intimate engagement with the mold ring 35 and to retain the packing 44 within the groove 42. A pair of axle forming rods 53 and 54 are welded or otherwise attached to the band 45 and such rods extend outwardly from opposite sides thereof with the rod 53 being received within the sleeve 27 and the rod 54 being received within the bearing 30.

An angle member 55 is mounted on the rod 54 in spaced relation to the free end thereof a distance greater than the length of the bearing 30 and is adapted to abut one end of such bearing to prevent axial movement of the rod in one direction. A cotter pin 56 located in an opening (not shown) on the opposite side of the bearing prevents axial movement of the rod in the opposite direction after the rod has been inserted therein. One web 57 of the angle member 55 is located beside the central post 29 above the upper cross member 24 in a position such that one end of the web will engage the post 29 to limit the rotation of the rod 54 and the mold ring 35. When the rod 54 is rotated substantially 180° from the position illustrated in FIGS. 1, 2 and 6, the opposite end of the web 57 will engage the opposite side of the central post 29 to prevent further rotation in the opposite direction. In order to retain the mold ring in rotated position, the web 57 has a lug 58 extending outwardly thereof (FIGS. 1, 6 and 12) and such lug receives one end of a spring 59 the opposite end of which is connected to a lug 60 fixed to the central post 29.

The hub 38 of the mold ring 35 is connected by bolts or other fasteners 63 to a plate 64 welded or otherwise attached to a substantially central shaft 65 which extends outwardly of both sides of the mold ring and generally normal thereto. If desired a back-up plate 66 may be disposed on the opposite side of the hub to increase the rigidity of the connection. The free ends of the shaft 65 are threaded to receive a force applying tool 67 which may include a nut 68 to which one or more operating handles 69 have been welded or otherwise attached.

With reference to FIG. 2, a pair of automobile tires 70, to which decorative trim 71 is to be vulcanized, are mounted on rims 72 having lug bolt openings 73 by which the tires may be mounted on an automobile. In order to center the tires on the device so that the trim is concentric, a cup 74 is provided having a threaded projection 75 with a bore 76 therethrough. The bore 76 is of a size to slidably receive the shaft 65 and preferably the depending sides of the cup are located outwardly of the lug bolt openings 73 as illustrated in FIG. 11 to apply pressure at the strongest portion of the rim. In order to mount the cup 74 on the rim 72, a nut 77 having a frustoconical surface 78 is provided which threadedly engages the projection 75. The cup is applied to the rim 72 so that the projection 75 extends through the central opening 79 thereof after which the nut 77 is applied until the frustoconical surface 78 engages the edge of the opening 79.

With reference to FIGS. 5–8, the tires 70 are not mounted on automobile rims and therefore a pair of auxiliary rims 82 and 83 are provided for each tire. The inner auxiliary rim 82 or rim nearest to the mold ring 35 preferably is expandable to make certain that the rim is in engagement with the tire and that the tire is centered on the mold ring. Such rim includes a pair of semicircular rings 84 having bead flanges 85 for engaging the bead of the tire. The rings 84 are connected by end spokes 86 and intermediate spokes 87 to a semicircular hub 88 having a generally semicircular opening 89 with a tapered surface 90. The semicircular rings 84 are connected by a bolt 91 located in opening 92 in each of the end spokes 86 and having a nut and washer 93 for regulating the tension on a spring 94 disposed about the bolt 91 between the nut and washer 93 and the spoke 86. The tension of the spring 94 tends to force the semicircular rings 84 toward each other and in order to move such rings apart so that they engage the tire, a sleeve 95 is provided having a tapered end portion 96 for complementary engagement with the tapered surfaces 90. The sleeve 95 is slidably mounted on the shaft 65 and is adapted to be moved axially thereof by a nut 97 which threadedly engages the threaded end of the shaft. Axial movement of the sleeve 95 in one direction will cause the semicircular rings 84 to move away from each other against the tension of the spring 94 and into engagement with the tire 70.

The auxiliary rim 83 includes a ring 98 having a bead flange 99 and such ring is connected by spokes 100 to a hub 101. The hub 101 has an opening 102 of a size to slidably receive the sleeve 95 so that the auxiliary rim 83 can be applied after the auxiliary rim 82 and the tire 70 are in position. The ring 98 is adapted to engage the semicircular rings 84 to provide the desired spacing for the beads of the tire, and in order to cause such engagement a hollow cup 103 is provided which is open at one end and has an internal diameter of a size to receive the sleeve 95 and the nut 97. The cup 103 has a closed end 104 with an opening 105 therein of a size to receive the threaded end portion of the shaft 65 so that the force applying tool 67 will engage the closed end 104 and move the cup 103 into engagement with the hub 101.

All unmounted tires are provided with an inner tube 106 or other vulcanizing tube to enhance the buffing operation and such tube will remain in the tire to pressurize such tire during the vulcanizing operation.

In order to prevent loss of heat from the mold ring 35 through the rims 72 or the auxiliary rims 82, a sheet of masonite 107 or other relatively hard material having insulating qualities may be located between the mold ring and the rims and fixed to such mold ring in any desired manner as by screws 109. Preferably the sheet of masonite 107 is substantially solid with an opening 108 in the center thereof to accommodate the hub 38 and flange plates 64 and 66.

With reference to FIGS. 13–16 a modified form of mold ring 110 is depicted having an enlarged portion 111 about its outer periphery and such enlarged portion preferably has two or more grooves 112 along each side thereof. As illustrated best in FIG. 15 the grooves 112 are provided with a cross-section complementary to the cross-section of the decorative trim 71 which will be vulcanized to the automobile tires 70. The grooves are recessed inwardly from opposite sides of the enlarged portion 111 and define ribs or land areas 113, 114 and 115. Adjacent to the rib 113 the enlarged portion defines a shoulder 116 connected to a central peripheral ring 117. The ring 117 is connected by spokes 118 to a hub 119. In this modification a pair of shafts 120 are provided each having a flange 121 which are connected together and to the hub 119 by bolts or other fasteners 122. The shafts 120 are disposed along the central axis of the mold ring 110 and extend outwardly from opposite sides thereof so that a tire can be mounted on each side of the mold ring in the same manner as previously described.

If desired a pair of disks 123 may be mounted on the mold ring 110, one on each side thereof, in any desired manner as by fasteners 124. Such disks are constructed of wood or other material having insulating qualities and have an outer diameter slightly less than the diameter of the enlarged portion 111 and a central opening 125 of a size slightly greater in diameter than the diameter of the flanges 121. The disks 123 preferably are of a thickness substantially equal to the length of the shoulder 116 for a purpose which will be described later.

With reference to FIG. 14 an auxiliary rim 127 is provided having inner and outer portions 128 and 129, respectively, connected together in a manner similar to the previously described auxiliary rim 83. The outer rim 129 has a bead flange 130 against which the bead of the tire is received; however, the inner portion 128 does not have such a flange. When the tire 70 is not mounted on an automobile rim such tire is provided with an inner tube 106 and is mounted on the auxiliary rim 127 in such a manner that the inner bead of the tire rests against one of the disks 123 when the inner tube is inflated.

In the operation of the device the frame 20 is moved to a position convenient to an outlet of a source of electrical energy. The rod 53 is then inserted within the sleeve 27 and moved through such sleeve until the rod 54 can be aligned with the bearing 30, whereupon the mold ring 35 is moved in the opposite direction until the rod 54 is received within such bearing and the angle member 55 is adjacent to the inner edge thereof. The cotter pin 56 is then placed in the rod 54 to prevent the withdrawal thereof and the spring 59 is connected to the lugs 58 and 60. Electrical energy is applied to the resistance coil 43 to heat the mold ring to a temperature sufficient to perform the vulcanizing process, such temperature being controlled by thermostat 47. In this position the mold ring is disposed in a generally horizontal position and a ring of decorative trim 71 is placed within the upper groove 40. If the tire to which the decorative trim is to be applied is mounted on an automobile rim, air is exhausted from the tire after which the cup 74 is placed on the rim and is connected thereto by the nut 77. The tire and rim are then raised to a position above the shaft 65 and lowered thereon with such shaft extending through the bore 76. The force applying tool 67 is then threaded on the end of the shaft 65 and tightened until the rim 72 is resting upon the sheet of masonite 107 and the tire casing is in engagement with the mold rim 35 and the decorative trim ring 71. Thereafter air under pressure is introduced into the tire 70 until the tire is under a pressure of approximately 40 pounds per square inch.

After the tire has been inflated the molding ring is rotated substantially 180° and the procedure is repeated on the opposite side so that two tires are in engagement with the mold ring simultaneously. When the vulcanization process has been completed the uppermost force applying tool is removed from the shaft 65 and the mold ring is rotated substantially 180° whereupon the tire and rim will fall by gravity from the shaft 65 onto the transverse bars 32 and then the other force applying tool can be removed and the mold ring again rotated 180° to discharge the second tire and rim.

In the event that the tire is not mounted on an automobile rim, an auxiliary rim 82 is placed on the sheet of masonite and bound down thereto by sleeve 95 and nut 97 before the decorative trim 71 is placed on the upper groove 40. The tire casing 70 with an inner tube 106 therein is then placed on the auxiliary rim 82 until the bead of the tire engages the bead flanges 85 of such auxiliary rim. The sleeve 95 is then tightened by nut 97 on the threaded shaft to force the tapered end 96 of the sleeve into cooperative engagement with the tapered surface 90 of the hub 88 and force the semicircular rings 84 apart until they positively engage the bead of the tire to center the operation. Thereafter, the auxiliary rim 83 is placed about the sleeve 95 until the bead flange 99 engages the other bead of the tire. The cup 103 is placed over the shaft 65 and in engagement with the hub 101 and the force applying tool 67 is threaded on the shaft 65 until the ring 98 of the auxiliary rim 83 is in engagement with the semicircular rings 84 of the auxiliary rim 82. Air under pressure is then introduced into the inner tube 106 as previously described after which the mold ring 35 is rotated 180° and the operation is repeated.

When the vulcanizing process has been completed the uppermost force applying tool 67 is removed from the shaft 65 and the auxiliary rim 83 is removed from the sleeve 95 so that when the mold ring is rotated substantially 180° the tire will fall by gravity onto the transverse bars 32. The auxiliary rim 82 will remain on the shaft 65 until such time as the nut 97 and the sleeve 95 are removed. After the mold ring has been rotated substantially 180° the other force applying tool and auxiliary rim 83 can be removed and the mold ring again rotated 180° to discharge the second tire.

In the operation of the modification illustrated in FIGS. 13–16 the mold ring 110 is adapted to accommodate a plurality of sizes of automobile tires on each side thereof. In the modern production of tires certain tires having the same rim size will be larger than other tires having the same rim size. For instance, a 7.00 x 14 tire would have a smaller profile than an 8.25 x 14 tire and, therefore, it is desirable to place the decorative trim in different positions on tires having the same rim size. If the trim is to be applied to a tire having a 13-inch rim or a low profile 14-inch trim, the trim is located in the innermost groove and when the tire has a 15-inch rim or a higher profile 14-inch rim, the trim is located in the outer groove. FIG. 14 illustrates two tires having substantially the same rim size and with different profiles. In the upper or low profile tire of the figure the decorative trim is in the innermost groove and when the tire is expanded by pressure within the same it will engage the decorative trim and will curve upwardly away from the rib 115 so that no objectable mark will appear on the tire. When a decorative trim is being applied to a high profile tire as illustrated in the lower portion of FIG. 14, the side of the tire casing will engage the disk 123 to prevent an objectionable mark being made by the rib 113.

It will be noted that any one of four different sizes of tires can be placed on either side of the mold ring 110 merely by placing the decorative trim in the appropriate groove. While the application of a single band or ring of decorative trim has been illustrated, it is contemplated that a plurality of trim rings could be applied by placing the decorative ring in each of the grooves. Also if desired the grooves may be small enough to accommodate relatively thin rings of decorative trim by providing as many grooves as desired along the surfaces of the mold ring.

It will be apparent that a relatively simple portable decorative trim vulcanizing apparatus has been provided which will vulcanize decorative trim to two tires simultaneously regardless of whether the tires are mounted on rims or not.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for vulcanizing decorative trim to an automobile tire comprising a portable frame, a pair of spaced aligned bearings mounted on said frame, a generally flat circular mold having trim receiving grooves on opposite sides thereof, means for heating said mold to a vulcanizing temperature, shaft means fixed to said mold and projecting axially from both sides thereof, means engageable with said shaft means for mounting a tire to be decorated on at least one side of said mold, rod means mounted on said mold and extending generally diametrically outwardly therefrom, said rod means being rotatably received in said bearings, means carried by said rod means for limiting lengthwise movement within said bearings, and means on said rod means permitting rotation of said mold greater than 90° and providing a stop to limit the amount of rotation, whereby decorative trim can be applied to one or more tires and said mold can be rotated more than 90° in said bearings.

2. The structure of claim 1 in which said means engageable with said shaft means includes a rim on which the tire is mounted, a cup, a threaded projection on said cup having a shaft receiving bore, a nut threadedly engageable with said projection, said nut having a frusto-conical surface engageable with said rim, and a force applying tool for moving said rim into engagement with said mold ring.

3. The structure of claim 1 in which said means engageable with said shaft means includes a first auxiliary rim and a second auxiliary rim on which the tire is supported, said first auxiliary rim including a pair of semicircular rings, spring means normally urging said semicircular rings together, said semicircular rings having hubs with tapered surfaces, a sleeve slidably mounted on said shaft, a tapered end on said sleeve for cooperative engagement with the tapered surfaces on said hubs, means for moving said sleeve axially of said shaft to cause said semicircular rings to move apart, cup means engageable with said second auxiliary rim, and a force applying tool engageable with said cup means for moving said second auxiliary rim into engagement with said first auxiliary rim and for moving said first auxiliary rim into engagement with said mold ring.

4. The structure of claim 1 including means for maintaining said mold in rotated position.

5. The structure of claim 1 in which said mold has multiple grooves on each side.

6. The structure of claim 1 including a heat insulating member mounted on said mold and located between the mold and portions of the tire to be decorated.

References Cited by the Examiner

UNITED STATES PATENTS

| | | | |
|---|---|---|---|
| 3,059,274 | 10/1962 | Fassero et al. | 18—18 X |
| 2,802,512 | 8/1957 | Rouse. | |
| 3,074,109 | 1/1963 | Duerksen | 18—18 |
| 3,075,237 | 1/1963 | Soderquist | 18—17 |
| 3,086,578 | 4/1963 | Breazeale et al. | 157—1.24 |
| 3,193,880 | 7/1965 | Capistrant et al. | 18—18 |
| 3,194,712 | 7/1965 | Pollock | 18—18 X |
| 3,214,791 | 11/1965 | Ericson et al. | 18—2 |

J. SPENCER OVERHOLSER, *Primary Examiner.*

J. HOWARD FLINT, JR., *Examiner.*